(12) United States Patent
Sherman

(10) Patent No.: US 10,844,893 B1
(45) Date of Patent: Nov. 24, 2020

(54) BLIND RIVET

(71) Applicant: Industrial Rivet & Fastener Co., Northvale, NJ (US)

(72) Inventor: Steven B. Sherman, New City, NY (US)

(73) Assignee: Industrial Rivet & Fastener Co., Northvale, NJ (US)

(*) Notice: Subject to any disclaimer, the term of this patent is extended or adjusted under 35 U.S.C. 154(b) by 0 days.

(21) Appl. No.: 16/448,975

(22) Filed: Jun. 21, 2019

Related U.S. Application Data

(60) Provisional application No. 62/857,130, filed on Jun. 4, 2019.

(51) Int. Cl.
*F16B 19/10* (2006.01)

(52) U.S. Cl.
CPC ...... *F16B 19/1054* (2013.01); *F16B 19/1072* (2013.01)

(58) Field of Classification Search
CPC .................................................. F16B 19/1054
USPC ........................................ 411/34, 41, 43, 45
See application file for complete search history.

(56) References Cited

U.S. PATENT DOCUMENTS

| | | | | |
|---|---|---|---|---|
| 3,937,123 A * | 2/1976 | Matuschek | ......... | F16B 19/1054 411/43 |
| 4,355,934 A * | 10/1982 | Denham | ................. | F16B 29/00 411/38 |
| 4,639,174 A * | 1/1987 | Denham | ............. | F16B 19/1054 411/34 |
| 4,702,655 A * | 10/1987 | Kendall | ............. | F16B 19/1054 29/523 |
| 4,765,010 A * | 8/1988 | Jeal | ........................ | B21H 3/022 470/11 |
| 4,907,922 A * | 3/1990 | Jeal | ..................... | F16B 19/1054 411/43 |
| 4,969,785 A * | 11/1990 | Wright | ................ | F16B 19/1054 411/34 |
| 5,503,510 A | 4/1996 | Golan | | |
| 6,551,040 B1 | 4/2003 | Terry et al. | | |
| 8,430,613 B2 * | 4/2013 | Ohkubo | ............. | F16B 19/1054 411/360 |
| 10,087,969 B2 | 10/2018 | Golan | | |
| 2013/0312245 A1 * | 11/2013 | Skolaude | ............... | B21J 15/043 29/525.06 |

* cited by examiner

*Primary Examiner* — Flemming Saether
(74) *Attorney, Agent, or Firm* — Blank Rome LLP

(57) ABSTRACT

A blind fastener has a sleeve and a pin. The sleeve has a shank with a shank bore and a head with a head bore smaller than the shank bore. The pin has a pin installation portion with a proximal end portion and a distal end portion. The pin also has a breakaway portion with a pin grip, and a pin break groove between the installation portion and the breakaway portion. The pin further has a grip portion at the proximal end portion of the pin installation portion and directly adjacent to the pin break groove. In a pre-installation configuration, the grip portion is in the sleeve bore. In an installation configuration, the grip portion is in the head bore and forms a friction fit with the head bore to prevent the installed sleeve from inadvertently coming free of the installed pin.

8 Claims, 3 Drawing Sheets

BLIND RIVET

RELATED APPLICATIONS

This application claims the benefit of U.S. Provisional Application No. 62/857,130, filed Jun. 4, 2019, the entire contents of which are incorporated herein by reference.

BACKGROUND OF THE INVENTION

Field of the Invention

The present invention relates to blind fasteners, and particularly blind rivets.

Background of the Related Art

Blind fasteners are used to secure workpieces together. Blind fasteners typically include a pin or mandrel, and a sleeve. Blind fasteners are shown, for example, in U.S. Pat. Nos. 5,503,510, 6,551,040, and 10087969. A through-hole is made in the workpieces, and the blind fastener is placed in the through-hole. A tool is then used to pull on the pin from one side of the workpieces, causing the sleeve to form a clamp at the blind side of the workpieces, typically in the form of a tulip.

SUMMARY OF THE INVENTION

A blind fastener has a sleeve and a pin. The sleeve has a shank with a shank bore and a head with a head bore smaller than the shank bore. The pin has a pin installation portion with a proximal end portion and a distal end portion. The pin also has a breakaway portion with a pin grip, and a pin break groove between the installation portion and the breakaway portion. The pin further has a grip portion at the proximal end portion of the pin installation portion and directly adjacent to the pin break groove. In a pre-installation configuration, the grip portion is in the sleeve bore. In an installation configuration, the grip portion is in the head bore and forms a friction fit with the head bore to prevent the installed sleeve from inadvertently coming free of the installed pin.

DETAILED DESCRIPTION OF THE INVENTION

Figure 1:
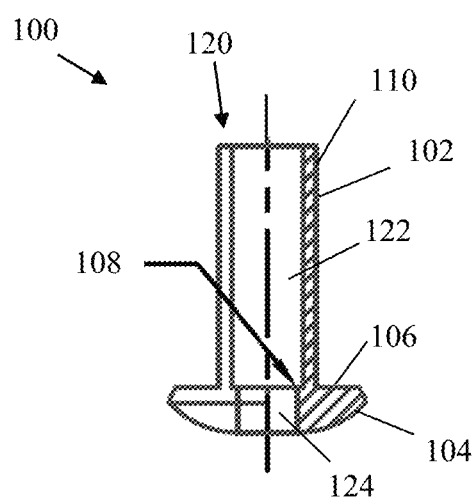
FIG. 1 is a cross-sectional view of a sleeve.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Figure 2:
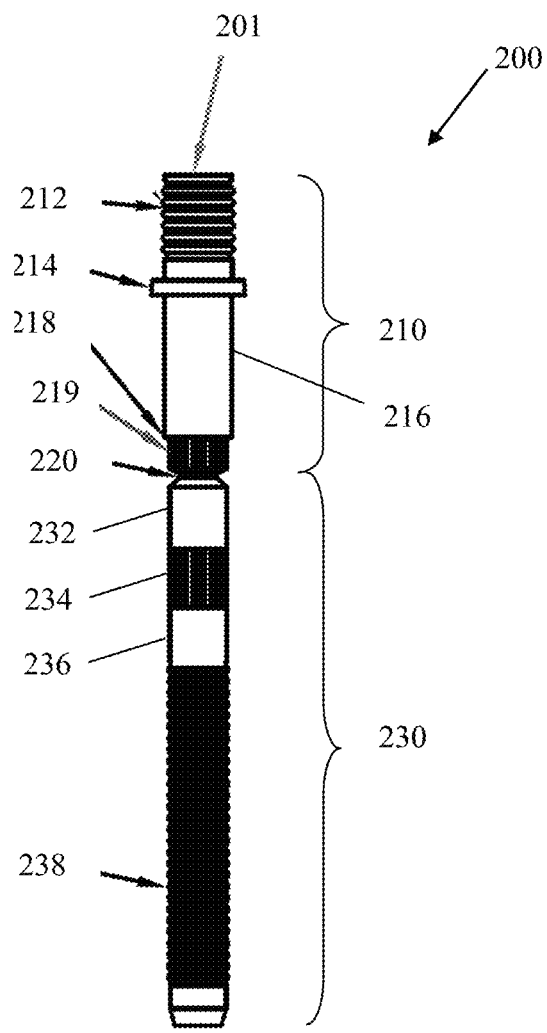
FIG. 2 is a side view of a pin.

Turning to the drawings, FIGS. 1-4 show the blind fastener 5 in one example non-limiting illustrative embodiment of the invention. The blind fastener 5 includes a sleeve 100 (FIG. 1) and a mandrel or pin 200 (FIG. 2).

FIG. 1 shows the sleeve 100 in a pre-installation configuration. The sleeve 100 includes a shank 102, head 104, exterior shoulder 106, interior sleeve stop shoulder 108, and a distal end portion having a distal end 110. The sleeve 100 can be elongated and is hollow. The sleeve 100 has a single continuous central bore 120 that has a sleeve bore portion 122 and a head bore portion 124. The sleeve bore 122 is slightly larger in diameter than the head bore 124, forming the sleeve stop shoulder 108 between the head 104 and the shank 102.

The pin 200 has a single continuous integral body 201 formed as a solid rod having a longitudinal axis that extends the length of the pin body 201. The pin body 201 includes an installation portion 210 at a distal end portion of the pin body 201 and a breakaway portion 230 at a proximal end portion of the pin body 201. Starting from the distal end of the pin 200 (and installation portion 210), the installation portion 210 has a crest 212, a first or installation smooth section 216, a pin stop shoulder 218, and a grip or grip section 219. The crest 212 has multiple annular raised rings that extend transversely about the pin body 201, forming major crests (ridges) and minor crests (valleys).

The installation smooth section 216 is directly adjacent to the crest portion 212 and has a diameter that is slightly smaller than the diameter of the crest 212. The length of the smooth section 216 can be adjusted to conform to the application, i.e., the length of the sleeve 100 and the through-hole in which the fastener 5 is used.

A shear ring 214 is formed concentrically about the smooth section 216. The shear ring 214 can be integrally formed with the smooth section 216 or can be a discrete element that is attached to the smooth section 216. The shear ring 214 is coupled to the smooth section 216 to break free from the smooth section 216 upon application of a predetermined pulling force, so that the shear ring 214 slides along the smooth section 216 and about the crest 212. In the installed condition, the shear ring 214 allows for uniform installation performance through a defined grip range. The shear ring and anneal zone provide improved blind side surface area.

The installation grip 219 is formed directly adjacent the smooth section 216 at the proximal end portion of the installation portion 210. Accordingly, the smooth section 216 has a distal end portion directly conned with the crest 212 and a proximal end portion directly connected with the grip 219. The installation grip section 219 can be, for instance, a knurled portion with channels and raised ridges that extend in the longitudinal direction of the pin 200. That is, the ridges are substantially parallel to the longitudinal axis of the pin 200. The installation grip 219 has a diameter that is slightly smaller than the diameter of the smooth section 216, forming a pin stop shoulder 218 where the installation grip 219 meets the installation grip 219.

The breakaway portion 230 has a distal end that includes a second or installation distal-side end smooth section 232, breakaway grip or grip section 234, and a third or installation proximal-side smooth section 236. The second smooth section 232 has a diameter that is the smaller than the diameter of the installation grip 219. The breakaway grip 234 is directly connected to the second smooth section 232, and has a diameter that is larger than the diameter of the second smooth section 232. The diameter of the breakaway grip 234 can be the same size or smaller than the diameter of the installation grip 219. The installation proximal-side end smooth section 236 is directly connected to the breakaway grip 234. Accordingly, the breakaway grip 234 is between the second smooth section 232 and the third smooth section 236. The second and third smooth sections 232, 236 can have substantially the same diameter, which is slightly smaller than the diameter of the breakaway grip 234. In addition, the length of the second and third smooth sections 232, 236 can vary depending on the particular application of the fastener 5.

The breakaway portion 230 also has a proximal end portion that includes pin grip rings 238. The pin grip rings 238 are directly connected to the third smooth section 236. In one embodiment, the third smooth is optional and not provided, so that the pin grip rings 238 directly connect to the breakaway grip 234.

A break groove 220 separates the installation portion 210 from the breakaway portion 250. The break groove 220 has a narrowed diameter with respect to the diameter of the adjacent grip 219 and installation distal-side smooth section 232.

Figure 3:
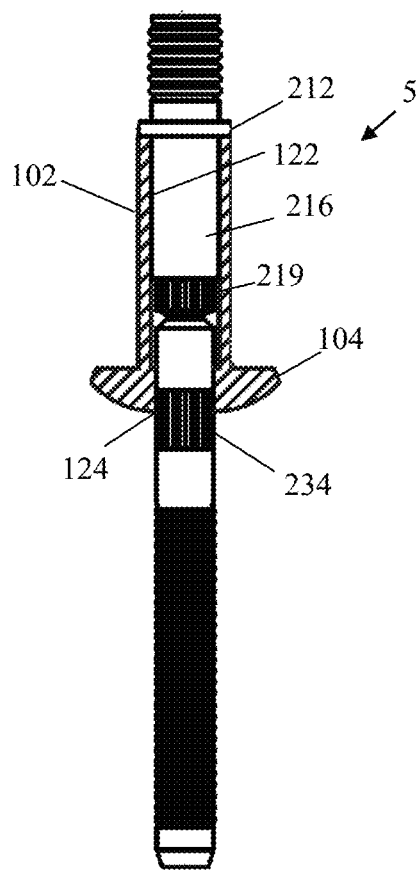
FIG. 3 is a side view of the sleeve mounted on the pin and ready for installation.

Turning to FIG. 3, the fastener 5 is shown in a pre-installation configuration. The sleeve 100 is placed on the pin 200, as assembled during manufacturing. The diameter of the shank bore 122 (i.e., the inner diameter of the shaft or shank 102) is slightly larger than the diameter of the smooth section 216 and is substantially the same size as the diameter of the knurled installation grip 219. In addition, the breakaway grip 234 has a diameter that is substantially the same as the shank bore 122 and slightly smaller than the head bore 124.

Accordingly, during manufacturing, the head bore 124 is forced onto the knurled breakaway grip 234, so that the sleeve 100 forms a friction fit with the pin 200. That holds the pin and sleeve together prior to riveting. It is noted that, at the same time, the shank bore 122 might also be forced onto the knurled installation grip 219 to further retain the pin and sleeve, depending on the specific dimensions and positions of the shank bore 122 and grip 219. In one embodiment, the installation grip 219 is only received in the head bore 124 and not in the shank bore 122, in the final installation configuration of FIG. 4. The friction fit between the shank bore 122 and the grip 219 and between the head bore 124 and the breakaway grip 234, are relatively weak, and only needs to be sufficiently strong to hold the sleeve 100 on the pin 200 so that the sleeve 100 does not inadvertently come free of the pin 200 during shipment and installation of the fastener 5. Thus, the user need not hold onto the sleeve 100 and/or pin 200 during installation. Thus, the user can simply place the assembled fastener 5 into the through-hole 19 (FIG. 4) of the workpieces 15, 17 to be coupled together by the fastener 5. As shown, the sleeve 100 slides all the way onto the pin 200 until the distal end 110 of the sleeve comes into direct contact with the shear ring 214, which stops movement of the sleeve 100 on the pin 200.

At this point, the assembled fastener 5 of FIG. 3 is ready to be installed. The user places the assembled fastener 5 into the through-hole 19 so that the sleeve 100 is fully inserted in the through-hole 19. In that position, the head 104 contacts the installation side of the workpiece 17, and the distal end 110 and a majority (or at least a portion) of the shank 102 extend through the through-hole 19 and to the blind side of the workpieces 15, 17.

The user then attaches an installation tool (not shown) to the grip rings 238. The tool pulls outward on the pin 200 substantially parallel to the longitudinal axis of the pin 200. In response, the pin 200 moves outward with respect to the sleeve 100. This action causes the shear ring 214 to apply an inward force to the distal end 110 of the sleeve 100. That force collapses the distal end portion of the sleeve shank 102 to collapse outward to form a tulip formation 250 (FIG. 4) that presses against the blind side of the workpiece 15.

The installation tool continues to pull on the pin 200. Once the tulip formation 250 is made, the continued pulling force of the installation tool increases the force/pressure on the shear ring 214. Once a threshold force is applied, the shear ring 214 breaks free of the installation smooth section 216. It then slides along the distal portion of the smooth section 216 (if any), and onto the crests 212. The diameter of the crests 212 are larger than the diameter of the shear ring 214, so that the shear ring 214 is fixedly engaged with the crest 212 up to a predetermined force. At the same time, the knurled installation grip 219 enters the narrowed head bore 124 until the pin stop shoulder 218 contacts the sleeve stop shoulder 108. The stop shoulders 218, 108 cooperate to stop further progress of the pin 200 with respect to the sleeve 100. At that point, the installation grip 234 is fully received in the head bore 124. The diameter of the installation grip 234 is slightly larger than the diameter of the head bore 124, so that the installation grip 234 forms a friction fit with the head bore 124. Thus, the installation grip 234 and head bore 124 hold the pin 200 and sleeve 100 together and resist the pin 200 coming free of the sleeve 100 in the direction of the blind-side.

Thus, the installation grip section 219 is forced into the central opening of the head portion 104 to form a friction fit therewith and prevent the pin 200 from inadvertently coming free of the sleeve 100. The grip section 219 provides substantial shear strength and tensile strength over a defined grip range with increased performance under dynamic load and/or vibration.

Figure 4:
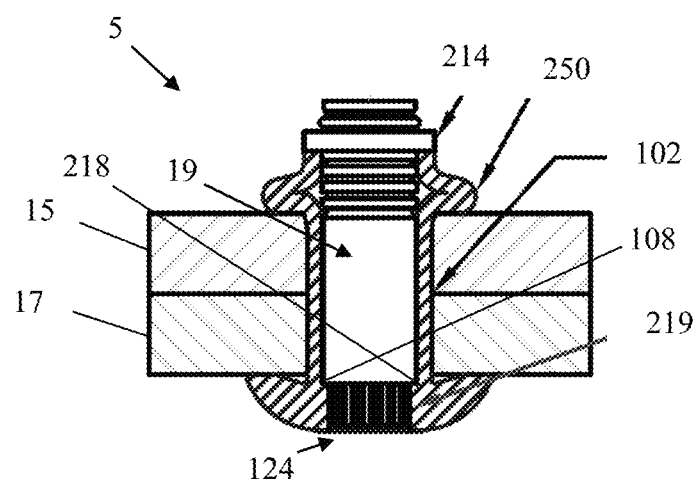
FIG. 4 is a cross-sectional view of the sleeve and pin post-installation.

At this point, the continued pulling force of the installation tool overcomes the predetermined threshold strength of the break groove 220. The pin 200 then breaks apart at the break groove 220. The installation portion 210 remains fastened to the workpieces 15, 17 about the through-hole 19, with the pin 200 recessed within the head 104. And the breakaway portion 230 comes free and can be recycled or discarded. FIG. 4 shows the final installation configuration of the fastener 5 to the workpieces 15, 17.

It is noted that the invention has been shown with a circular rod and different portions having different diameters. However, other suitable shapes can be provided with different outer perimeter dimensions. In addition, it is noted that the illustrated embodiment shows the grip sections 219, 234 as being knurled. For example, the ridges of the knurled region can compress slightly into the channels by force of the sleeve 100 being pulled onto the grip 219. That allows that the knurled region provides a reliable grip and engagement between the sleeve 100 and the pin 200, and allows a suitable force to pull the grip 219 into the head bore 124. However, the grips 219 and/or 234 can be any suitable gripping mechanism. For example, the grips 219, 234 need not be knurled but can be smooth and with a larger diameter than other portions of the pin 200. In addition, while the invention is shown and described with the grip 219 forming a friction fit with the head bore 124 in the installation position, it can also or alternatively form a friction fit with the shank bore 122. And, the sleeve stop shoulder 108 need not define the boundary between the head 104 and the shank 102, but can be positioned in the shank 102.

In one illustrative, non-limiting embodiment, the pin 200 has a length of about 47 mm and a diameter of about 2.5 mm. The rings 238 are about 25 mm in length, the third smooth portion 236 is about 1 mm in length, the grip 234 is about 3 mm in length, the second smooth portion 232 is about 5.5 mm in length, the grip 219 is about 2 mm in length, the smooth section 216 is about 4 mm in length, and the crest 212 is about 5 mm in length. The major crest diameter is about 3 mm and the minor crest diameter is about 2.7 mm. The sleeve 100 has a shank length of about 9 mm, an inner shank bore diameter of 3.5 mm, a head length of about 3 mm, and a head bore of about 3 mm. Other suitable dimensions are noted in Table 1 below. While specific dimensions are given here, the dimensions are not intended to be limiting. Any suitable sizes and shapes can be provided, including the diameters and lengths of the sleeve, head and pin.

TABLE 1

| Feature# | Desc | 4.8 mm Configuration | 6.4 mm Configuration |
|---|---|---|---|
| 238 | Pin grip ring diameter | 3.0 mm | 4.1 mm |
| 236 | Third smooth diameter | 2.9 mm | 3.9 mm |
| 234 | Grip diameter | 3.09 mm | 4.16 mm |
| 232 | Second smooth diameter | 2.9 mm | 3.9 mm |
| 219 | Grip diameter | 3.5 mm approx | 4.8 mm approx |
| 212 | Crest diameter | 3.7-3.8 | 5.0-5.2 |
| 200 | Mandrel Overall Length | 40 mm+ (Variable) | 40 mm+ (Variable) |

The present invention provides high strength, with a wide bearing surface on the blind side of the application over an extended grip range using a shear ring and an interference fit. This offers expanded radial support for use in softer, thinner materials due to the wide bearing surface at the blind side over a wider grip range. The invention also solves certain manufacturing challenges, since all of the elements of the pin 200 (including the grip 219) and the sleeve 100 (including the sleeve bores 122, 124) are easier to manufacture and do not require specially shaped extrusion tooling that is sensitive to wear, and specific machine capacities to make. This reduces manufacturing cost and improves reliability with high strength with a wide bearing surface on the blind side of the application over an extended grip range using a shear ring and an interference fit between the sleeve and the pin. The interference fit provides a rivet that is easier and less costly to produce, with improved shear, tensile and clamp load properties.

The rivet has a weakened section on the sleeve to facilitate the controlled expansion of the wide bearing surface on the blind side. The pin and sleeve can be manufactured by cold forming, surface and metallurgical treatment, and assembly processes. Cold forming processes include cold heading, thread rolling. Surface and metallurgical treatments include heat treatment and plating. Assembly processes are utilizing an assembly machine.

It is noted that the description and claims use several geometric or relational terms, such as pin and rod. In addition, the description and claims use several directional or positioning terms and the like, such as concentric, central, inner, outer, distal, blind-side, parallel, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact.

Within this specification, the various sizes, shapes and dimensions are approximate and exemplary to illustrate the scope of the invention and are not limiting. The sizes and the terms "substantially" and "about" mean plus or minus 15-20%, or in other embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The foregoing description and drawings should be considered as illustrative only of the principles of the invention. The invention may be configured in a variety of shapes and sizes and is not intended to be limited by the embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A blind rivet comprising:
    a sleeve having a shank with a shank bore, a proximal end having a head with a head bore, a sleeve stop shoulder formed between the shank bore and the head bore, and a distal end opposite the proximal end, wherein the head bore is smaller than the shank bore;
    a pin having a pin installation portion with a proximal end portion and a distal end portion, a pin breakaway portion with a pin grip; and a pin break groove between the pin installation portion and the pin breakaway portion;
    a crest at the distal end portion of said pin installation portion;
    a first smooth section having a distal end portion directly adjacent said crest and a proximal end portion;
    a shear ring positioned about said first smooth section and configured to break free of said first smooth section and engage said crest upon a first threshold force;
    a first knurled grip portion having a distal end portion directly adjacent the proximal end portion of said first smooth section and a proximal end portion directly adjacent to the pin break groove, said first knurled grip portion configured to form a friction fit with said head bore during installation of said sleeve;
    a pin stop shoulder formed between said first smooth portion and said first knurled grip portion, whereby a diameter of said first knurled grip portion is smaller than a diameter of said first smooth portion; and
    a second smooth section at a distal end portion of said breakaway portion and directly adjacent to the pin break groove; and
    a second knurled grip portion directly adjacent to said second smooth section and between said second smooth section and said pin grip, said second knurled grip portion configured to form a friction fit with said head bore during pre-installation of said sleeve, wherein during pre-installation the pin break groove and first knurled grip portion are received in said shank bore and are closer to the proximal end of said sleeve than the distal end of said sleeve.

2. The blind rivet of claim 1, wherein the knurl comprises channels and raised ridges, whereby the ridges extend substantially parallel to a longitudinal axis of said pin.

3. The blind rivet of claim 1, wherein said distal end portion of said sleeve forms a tulip in the installation configuration.

4. The blind rivet of claim 1, wherein said first knurled grip portion has a first grip outer diameter and said head bore has a head bore inner diameter, and wherein said first grip outer diameter is slightly larger than said head bore inner diameter, so that said first knurled grip portion forms the friction fit with said head bore.

5. The blind rivet of claim 4, said fastener having a pre-installation configuration in which said first knurled grip portion is received in said shank bore and said second knurled grip portion is received in said head bore, and wherein said second knurled grip portion has a second grip outer diameter that is slightly larger than said head bore inner diameter so that said second knurled grip portion forms the friction fit with said head bore.

6. The blind rivet of claim 5, said fastener having an installation configuration in which said first knurled grip portion is received in said head bore only, said pin stop shoulder engages said sleeve stop shoulder, and said break-away portion is broken free from said installation portion at said break groove, and said shear ring is engaged with said crest.

7. The blind rivet of claim 1, wherein said second knurled grip portion has a grip outer diameter that is slightly larger than an inner diameter of said head bore, so that said second knurled grip portion forms the friction fit with said head bore.

8. The blind rivet of claim 1, further comprising a third smooth section positioned between said pin grip and said second knurled grip portion.

* * * * *